United States Patent [19]

Ross

[11] 3,863,973
[45] Feb. 4, 1975

[54] POLE TRAILER LIFTING ATTACHMENT

[76] Inventor: Dennis Roger Ross, Box 397, Lumby, British Columbia, Canada

[22] Filed: Oct. 19, 1973

[21] Appl. No.: 407,945

[52] U.S. Cl. .............. 294/74, 294/82 AH, 294/86 R
[51] Int. Cl. .............................................. B66c 1/20
[58] Field of Search ............ 294/67 E, 67 A, 74, 75, 294/76, 82 AH, 86 R; 105/160; 280/179 A, 404

[56] References Cited
UNITED STATES PATENTS

| | | | |
|---|---|---|---|
| 1,421,993 | 7/1922 | Rofe............................... | 294/82 AH |
| 1,498,150 | 6/1924 | Butler............................ | 294/82 AH |
| 3,013,807 | 12/1961 | Winterhoff................... | 280/179 A X |
| 3,125,350 | 3/1964 | Thiermann..................... | 280/404 X |
| 3,142,463 | 7/1964 | Dyer............................. | 280/179 A X |
| 3,512,664 | 5/1970 | Tolle............................. | 294/74 X |
| 3,708,197 | 1/1973 | Rowan et al..................... | 294/67 E |

*Primary Examiner*—Evon C. Blunk
*Assistant Examiner*—Johnny D. Cherry
*Attorney, Agent, or Firm*—Carver and Company

[57] ABSTRACT

An attachment for a pole trailer for facilitating loading of the trailer on the bed of a truck which includes a length of wire rope bent to a U-shape and maintained so by a bridging piece connecting its free ends. The rope is secured to the pole trailer by means of clamps which engages the rope bight and maintains the rope in a normal upright position with the bridging piece extending above the bunk. Inherent springiness of the rope enables the latter to deflect to a position below the bunk when the pole trailer is loaded and to return to its normal position when the trailer is unloaded.

3 Claims, 3 Drawing Figures

1

POLE TRAILER LIFTING ATTACHMENT

BACKGROUND OF THE INVENTION

1. Field of the Invention

This invention relates to pole trailers and in particular to attachments thereto to facilitate loading on and unloading from the trailers their towing vehicles.

2. Prior Art

The truck and pole trailer combination of the type conventionally used in logging operations, when running empty, are usually disposed in a piggy-back configuration; that is with the pole trailer hoisted onto the truck bed. This provides for greater safety and economy of operation and, in fact, is required in certain jurisdictions.

To this end, pole trailer manufacturers have fitted the trailers with a variety of lugs, loops, etc., which can be engaged by lifting devices such as cranes, fork lifts, and the like, which enables the truck driver to handle the pole trailer for loading or unloading operations. Most of the lifting attachments of prior art are so constructed that they require adjustment by the truck driver to position them for engagement by hoisting equipment for loading off or loading on and which then must be repositioned to ensure that they are not damaged by the load carried when the truck and trailer combination is set up for load carrying purposes.

Furthermore the operation of loading on and loading off has usually required the services of two men, one of whom operates the hoisting equipment while the other positions or secures the lifting attachment for engagement by the hoisting equipment. Although hoising equipment is usually available to a truck driver extra help is not usually available and, consequently, he has great difficulties and wastes much in a loading off or loading on operation.

SUMMARY OF THE INVENTION

The present invention provides a lifting attachment for pole trailers which enables the truck driver alone to easily carry out a loading on and loading off operation, which is always in position for engagement by a hoisting apparatus without the necessity of adjustment and which also automatically moves aside to a position of safety when the trailer is loaded so as not to suffer damage.

The lifting attachment of the present invention is also relatively inexpensive to fabricate and install and can be readily installed by a truck driver himself.

The lifting attachment of the present invention includes a length of springy wire rope bent into a U-shape so as to have a bight and straight parallel legs, a bridging piece connecting the free ends of the legs, means engageable with the bight for clamping the rope in an upright position at the center of gravity of the trailer with the bridging piece normally extending above the trailer bunk, so the rope can deflect to a position in which the bridging piece is below the trailer bunk when the trailer is loaded and can return to its normal position above the trailer bunk when the trailer is unloaded.

The drawings and description following merely exemplify one form of the invention, which however, is capable of expression in structure other than that described and illustrated.

DETAILED DESCRIPTION

Figure 1:
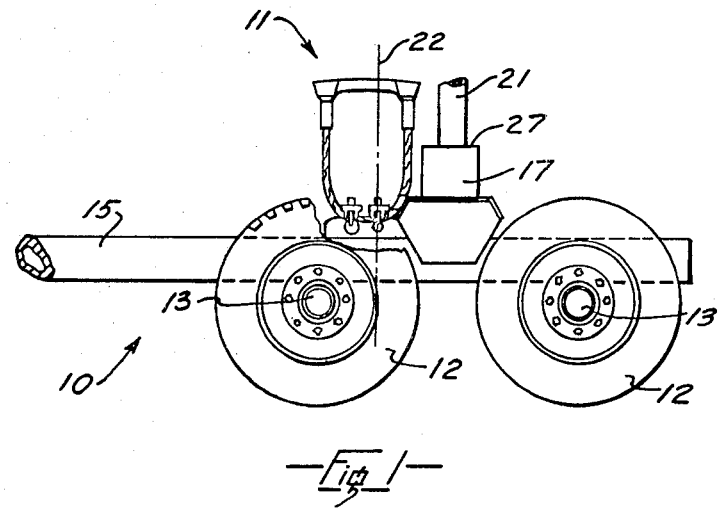
FIG. 1 is a side view of a portion of a pole trailer having the lifting attachment of the invention secured thereto.
Figure 2:
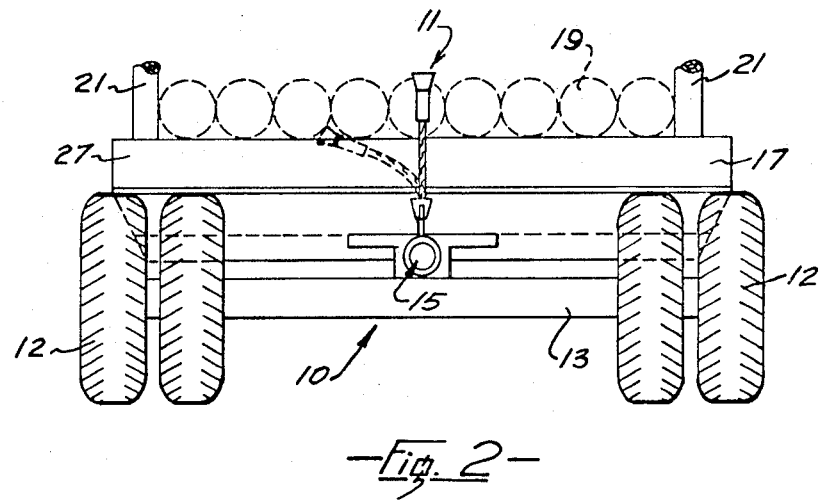
FIG. 2 is an end view of the pole trailer of FIG. 1 carrying a load of logs shown in phantom, and with the lifting attachment of the invention shown in an extended condition, in solid outline, and in a hidden position, in broken outline.

Referring to the drawings and in particular to FIGS. 1 and 2 a conventional pole trailer 10 is shown with a lifting attachment 11 of the invention secured thereto. The trailer, conventionally, has dual wheels 12 mounted in tandem on axles 13 and a central longitudinally extending pole 15, shown only partially, which can be secured to a towing truck, not shown in a conventional manner.

The trailer normally has a load carrying bunk 17 which extends transversely between the wheels which supports loads such as logs 19, and which are retained on the vehicle bunk by side stakes 21—21. Due to the forward extension of pole 15 the center of gravity of conventional trailers, vertical axis which is indicated by line 22, is just forwardly of the bunk.

Figure 3:
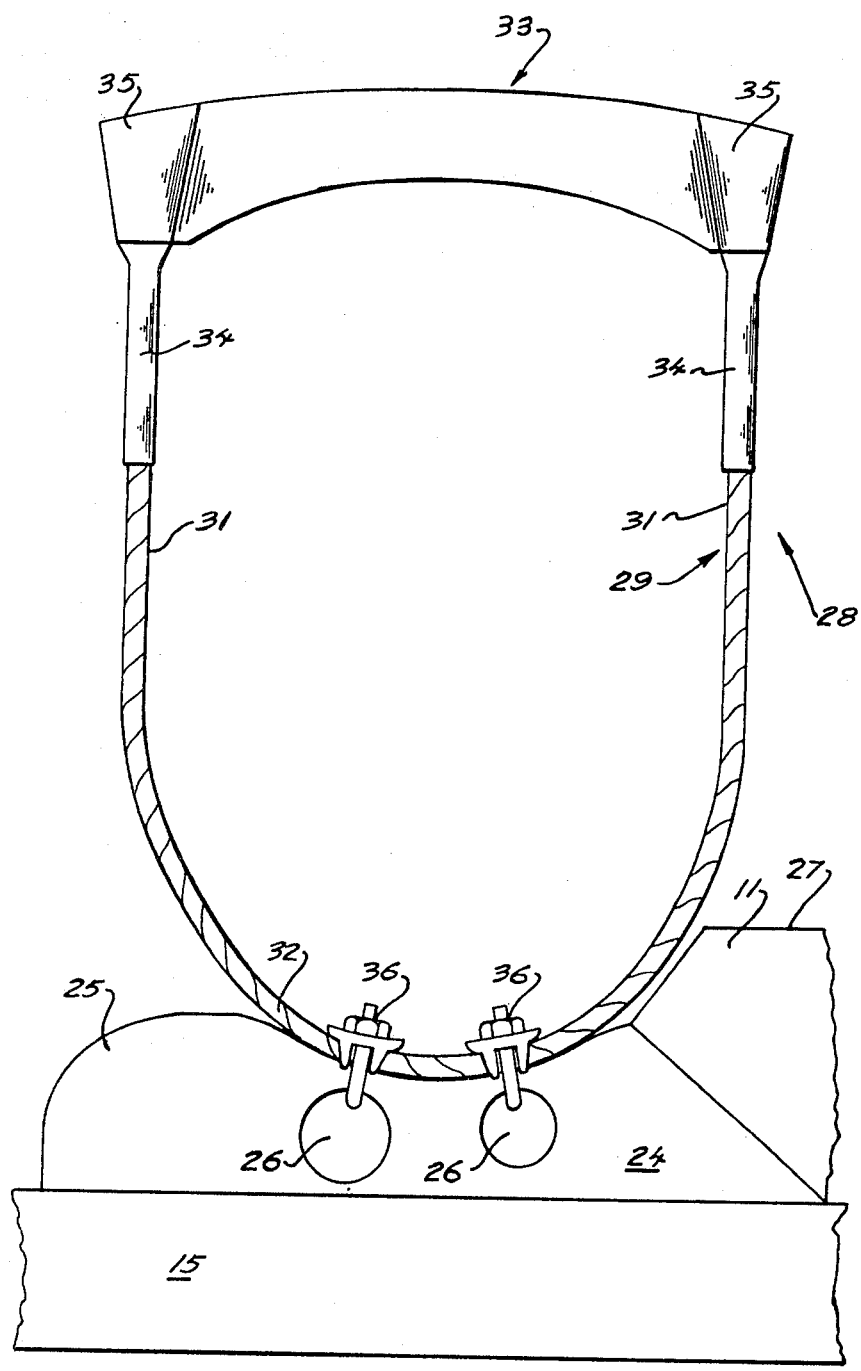
FIG. 3 is an enlarged side view of the lifting attachment of the invention.

The lifting attachment 11, see particularly FIG. 3, has an attachment plate 24 which is disposed in an upright fore and aft extending position just ahead of the bunk and has a rigid welded connection to both the pole and the bunk. The attachment plate has a saddle-shaped upper edge 25 and has a pair of centrally disposed, spaced openings 26—26. The upper edge 25 of the attachment plate, it is seen, lies below the lower bearing surface 27 of the bunk.

The attachment plate 24 serves as a seat for a flexible shackle 28 which is formed of a length of steel wire rope 29 bent to a U-shape so as to provide a pair of parallel legs 31—31 and a bight 32. Free ends of the legs are connected by a bridging piece, generally 33. The bridging piece 33 has a pair of parallel sleeves 34—34 at opposite ends which fittedly receive the legs of the wire rope and which terminate in sockets 35—35 within which the rope is secured by conventional means, e.g., by babbiting or by a ferrule arrangement.

The bight 32 of the rope is engaged by a pair of spaced clamps 36—36 which engage in the openings 26—26 of the attachment plate and which can be tightened against the rope to bring the latter into frictional engagement with the upper edge 25 of the attachment plate.

The flexible shackle is disposed so that the legs of the rope extend upright and the length of the rope is such that the bridging piece 33 extends substantially above the load bearing surface 27 of the bunk 17. Diameter of the rope is so related to the unsupported length of the legs such that the rope, although capable of being flexed from left to right below the bunk, will return to a normal upright position with the bridging piece elevated above the bunk.

Use

When the trailer is loaded with the logs 19, resiliency of the wire ropes permits the shackle to deflect to left or right to a hidden position below the upper surface of the bunk. When the logs are unloaded the shackle returns to its normal upright position, in which postion the bridging piece can be engaged by the forks of a fork lift loader so that the trailer can be hoisted aboard its towing vehicle. It is evident that as the shackle will always be in an upright position when the trailer is in an unloaded condition the services of an extra man normally employed for this operation is not necessary.

I claim:

1. A lifting attachment for pole trailers having a transverse load bearing bunk including:
   a. a length of springy wire rope bent into a U-shape configuration so as to have a bight and straight parallel legs,
   b. an elongated rigid bridging piece rigidly connected at its ends to the free ends of the legs, for restraining the length of rope in said U-shaped configuration,
   c. means engageable with the rope bight for securing the rope to the trailer near the center of gravity of the latter, and below the bunk, in a normal upright position with the bridging piece uppermost,
   d. length of the legs being such that the bridging piece extends above the trailer bunk when the rope is in its normal upright position so as to enable the bridging piece to be engaged by a lifting device.

2. A lifting attachment as claimed in claim 1 in which the bridging piece has elongated sleeves at opposite ends for fitted receiving ends of the wire rope, the sleeves terminating in tapered sockets.

3. A lifting attachment as claimed in claim 1 in which the means for attaching the rope to the trailer includes:
   a. an attachment plate secured in a fore and aft position to the bunk and the pole of the pole trailer, the attachment plate having a saddle-shaped upper edge for fittedly seating the rope bight,
   b. longitudinally spaced clamps secured to the attachment plate and engageable with the rope bight for drawing the rope into frictional engagement with the saddle shaped upper edge of the plate.

* * * * *